US008814153B2

(12) United States Patent
Toncelli

(10) Patent No.: US 8,814,153 B2
(45) Date of Patent: Aug. 26, 2014

(54) AUTOMATIC CLAMPING DEVICE FOR SLAB MATERIAL AND CLAMPING METHOD ASSOCIATED THEREWITH

(76) Inventor: Luca Toncelli, Bassano del Grappa (IT)

( * ) Notice: Subject to any disclaimer, the term of this patent is extended or adjusted under 35 U.S.C. 154(b) by 468 days.

(21) Appl. No.: 12/988,159

(22) PCT Filed: Apr. 10, 2009

(86) PCT No.: PCT/IB2009/051523
§ 371 (c)(1),
(2), (4) Date: Oct. 15, 2010

(87) PCT Pub. No.: WO2009/128007
PCT Pub. Date: Oct. 22, 2009

(65) Prior Publication Data
US 2011/0031671 A1      Feb. 10, 2011

(30) Foreign Application Priority Data

Apr. 18, 2008  (IT) ............................... TV2008A0064
Sep. 30, 2008  (IT) ............................... TV2008A0123

(51) Int. Cl.
*B25B 1/00*   (2006.01)
*B25B 11/00*  (2006.01)

(52) U.S. Cl.
CPC ................................. *B25B 11/005* (2013.01);
*Y10S 269/90* (2013.01)
USPC .............................. 269/100; 269/21; 269/900

(58) Field of Classification Search
CPC ........... B23P 6/02; B23P 19/027; B25B 1/00;
B25B 11/005
USPC ....................................... 269/21, 20, 903, 900
See application file for complete search history.

(56) References Cited

U.S. PATENT DOCUMENTS 5,590,870 A *  1/1997  Goellner ........................ 269/21
6,264,185 B1   7/2001  Isobe et al.
(Continued)

FOREIGN PATENT DOCUMENTS

EP   1099510 A2   5/2001
WO   9805468 A1   2/1998
WO   9920437 A1   4/1999

OTHER PUBLICATIONS

"PCT International Search Report dated Nov. 30, 2009 for PCT/IB2009/051523, from which the instant application is based," 3 pgs.

*Primary Examiner* — Lee D Wilson
(74) *Attorney, Agent, or Firm* — Fredrikson & Byron, P.A.

(57) ABSTRACT

An automatic clamping device for clamping a slab (90) of rigid material onto the worktable (18) of an operating machine comprises a central body (42) terminating at both ends in a bottom cavity (72) and a top cavity (77) each having a suction cup function and being intended to engage, respectively, with the table (18) and the slab (90). The bottom cavity (72) is designed to engage with a through-hole. (30) formed in the thickness of said table (18) and communicating with an air suction duct (26, 28) in turn connected to an air suction source, so as to form a single air suction circuit, the through-hole (30) being associated with shut off valve (32) and closing member 36 for interrupting communication between the cavity (72) and the suction source. The central body (42) also has, formed therein, an inner cylindrical chamber (56) housing a piston (58) associated with a stem (60) acting as a closing member movable, together with the piston (58), between a first position where it prevents fluid communication between the bottom cavity (72) and die top cavity (77) and a second position where it allows said communication with the sole air suction circuit, causing clamping, via the suction cup effect, of the slab (90) to die central body (42) of the automatic clamping device (40).

20 Claims, 11 Drawing Sheets

(56) References Cited

U.S. PATENT DOCUMENTS

| | | | |
|---|---|---|---|
| 6,302,387 B1 * | 10/2001 | Schmalz et al. | 269/21 |
| 6,561,086 B2 * | 5/2003 | Miyachi et al. | 100/258 R |
| 6,722,642 B1 * | 4/2004 | Sutton et al. | 269/21 |
| 7,055,535 B2 * | 6/2006 | Kunisawa et al. | 134/157 |
| 7,192,017 B2 * | 3/2007 | Wang et al. | 269/21 |
| 2003/0151182 A1 * | 8/2003 | Bavelloni | 269/21 |
| 2006/0231995 A1 * | 10/2006 | Wang et al. | 269/21 |
| 2009/0230603 A1 * | 9/2009 | Kurz et al. | 269/21 |
| 2011/0031671 A1 * | 2/2011 | Toncelli | 269/100 |

* cited by examiner

AUTOMATIC CLAMPING DEVICE FOR SLAB MATERIAL AND CLAMPING METHOD ASSOCIATED THEREWITH

RELATED APPLICATIONS

This application is a 35 U.S.C. 371 national stage filing from International Application No. PCT/IB2009/051523 filed Apr. 10, 2009 and claims priority to Italian Application No. TV2008A000123 filed Sep. 30, 2008 and to Italian Application No. TV2008A000064 filed Apr. 18, 2008, the teachings of which are incorporated herein by reference.

FIELD OF THE INVENTION

The present invention relates to an innovative device and a method for clamping rigid materials in slab form on the worktable of an operating machine.

More specifically the present invention relates to automatic clamping devices for clamping on the work surface of an operating machine, for example a numerical-control shaping machine, a slab of rigid material such as natural or agglomerate stone, ceramic material, glass and metal, preferably in a predefined position depending on the machining operation to be performed on the slab.

BACKGROUND

In the description which follows, for the sake of easier and simpler illustration, reference will be made by way of an operating machine to a numerical-control machine tool for shaping slabs (for example of the type produced and marketed under the name "Contourbreton" by Breton S. p. A) using a tool mounted on a chuck displaceable in a controlled manner along a beam in turn displaceable relative to the work surface, so that the chuck and therefore the tool may be positioned opposite each point of the said surface.

The work surface consists of a table, preferably made of aluminium, on which the slabs to be machined are placed and temporarily fixed in position (for the time needed to performed the desired machining operations).

Clamping is usually performed by means of vacuum (suction cup) devices of variable shape and size, which are arranged in positions depending on the shape of the slab to be machined and in a number suitable for ensuring secure clamping of the slab also when subject to the stresses resulting from the action of the tool.

It should be noted in particular that the slabs to be machined must be clamped so as to leave between the bottom surface of the slab and the upper surface of the work surface sufficient space to allow penetration, into the slab, of tools (such as drilling bits or edge shaping tools, etc.) which must pass through the entire thickness of the slab.

Usually the machine also comprises a tool-holder store or crib and an automatic tool-changing mechanism.

Two operating methods are known and used to fix the slabs, i.e.:

(i) tables (or benches) are used, these having in their upper surface T-shaped grooves along which members for fixing simple single-acting suction cups are positioned and secured, said suction cups allowing clamping of the slab arranged on their upper ends;

(ii) the table is flat and continuous and has, positioned on its upper surface, double suction cup members, i.e. members which have two suction cups directed upwards and downwards respectively, so that the latter is intended to fix the member to the table, while the upper suction cup is used to fix in position the slab to be machined.

In any case, positioning of the suction cups is performed manually and necessarily involves the following operations:

determining the position in which each suction cup must be arranged (said position may be indicated by a light beam emitted, for example, by a laser projector);

manually arranging a suction cup in each of the given positions;

fixing the suction cup in the predefined position.

If the suction cup is of the single-acting type, fixing is performed mechanically, after which the individual suction cups (i.e. their cavities) are connected to an active air suction circuit and therefore placed under a vacuum by means of flexible pipes.

Then the slab to the machined is placed on top of the suction cups and the air suction circuit is activated, creating a vacuum inside the cavities of the suction cups such as to retain and clamp the slab in the desired position.

If the suction cup is of the double-acting type, firstly each bottom suction cup, i.e. the suction cup resting on the work table or surface of the machine, is connected via a flexible pipe to a first active air suction circuit.

Then the bottom suction cups are fixed to the table, activating the first suction circuit so as to create a vacuum inside the cavities of the suction cups.

Then each upper suction cup is connected by means of a flexible pipe to a second air suction circuit independent of the first circuit.

The slab to be machined is placed on top of the upper suction cups of the two suction cups: if the machine is not equipped with an electronic feeler for detecting the exact position of the slab relative to the table, the slab is arranged so that at least one edge thereof comes into contact against suitable mechanical stops positioned on the edges of the table.

Finally the second air suction circuit is activated, namely the suction circuit which serves the cavities of the upper suction cups of each suction-cup pair, so that the slab is clamped in the desired position by the vacuum created inside the suction cups.

This procedure poses significant problems and drawbacks from an industrial point of view not only because it is long and laborious, but also because it requires action on the part of specialised labour.

Moreover, when the machining of each slab (for example forming part of a batch of slabs) has been completed, equally long operations are required not only in order to release the slab at the end of the machining operation, but also and in particular in order to rearrange the suction cups in the positions required for new slabs with different machining requirements.

Equally problematic is the presence of numerous small flexible pipes (two for each double-acting suction cup), for connecting the suction cups to the respective air suction source, not only as regards the space occupied on the machine table, but also with regard to the possibility of faults or malfunctions.

BRIEF SUMMARY OF EMBODIMENTS OF THE INVENTION

The main object of the present intention is to solve in an industrially advantageous manner the problems and drawbacks briefly mentioned above and in particular to provide a device which is able to:

(i) reduce the time required for fixing and separating the slab to be machined on/from the work table of the operating machine;

(ii) simplify the operations which the operator must perform, reducing his/her action to a minimum;

(iii) eliminate the flexible pipes for connecting the suction cups to the associated air suction circuit;

(iv) allow arrangement of the suction cups in a plurality of positions on the table so as to be able to machine slabs of any shape—including a complex shape—and size.

These objects are achieved by an automatic clamping device defined in claim 1 and by a machine equipped with automatic clamping devices, as defined in claim 6, which envisages essentially the following main features:

(a) a modified machining table is used, said table having a grid arrangement of through-holes which are formed in its thickness and which house individual shut-off valves for controlling the fluid communication between the upper surface of the table and a plurality of fixed pipes provided permanently on the bottom surface of the table and forming a single air suction circuit in turn communicating with a suction source such as a pump.

(b) The devices used for clamping the slabs to be machined are of the type comprising two oppositely arranged suction cups fixed to a cylindrical body and respectively directed upwards and downwards, where:

(i) the suction cup directed downwards, or bottom suction cup, has centrally a seat shaped in the manner of a circular bowl designed to be positioned in a centred position with respect to one of the holes of the table and interact with the top end of the closing member of the corresponding shut-off valve, actuating it into the open condition of the valve against the opposing action of a compression spring, the said seat also being in fluid communication with the chamber of said bottom suction cup which surrounds externally the bowl-shaped part of the seat;

(ii) the suction cup directed upwards has centrally a hole communicating with a cylindrical chamber seating a piston, the stem of which (acting as a closing member and directed upwards) is housed inside said hole with the outer end projecting from the contour of the suction cup, the piston being biased by a compression spring towards the position where said stem is in a condition fully projecting from the contour of the suction cup;

(iii) the cavity of said bottom suction cup surrounding said bowl-shaped seat is in fluid communication via respective ducts both with the said cylindrical chamber upstream of said piston and with the said hole downstream of said piston;

(iv) the part of said cylindrical chamber downstream of said piston communicates with the external atmosphere via a separate duct.

(c) The shut-off valves have a closing member movable vertically between respective positions for closing and opening the valve and therefore for interrupting or allowing the fluid flow through the valve, the top end of said closing member projecting from the top surface of the valve.

As a result of these characteristic features, as will appear more clearly from the detailed description which follows, referring to a preferred embodiment, with the machine according to the present invention it is possible to use a single source and a single suction circuit in order to operate both suction cups, eliminating the flexible pipes used hitherto.

In particular, when the double suction-cup device is arranged with the aforementioned seat centred on one of the holes formed in the machining table, the closing member of the corresponding shut-off valve is operated, establishing communication between the bowl of the seat and therefore the cavity of the bottom suction cup and the air suction duct situated underneath the shut-off valve. By suitably adjusting the degree of vacuum inside the cavity of the bottom suction cup (a relatively small vacuum is sufficient) the latter is fixed on the surface of the machining table in the desired position, together also with the entire double suction-cup device.

At the same time the vacuum generated inside the cavity of the bottom suction cup is connected also to the cylindrical chamber upstream of the piston which, however, is kept in the upper end-of-travel condition (namely with the piston stem projecting outside the contour of the upper suction cup) by the force of the opposing spring acting on the same piston.

In this condition the piston stem keeps closed the communication opening between the cavity of the bottom suction cup and the cavity of the upper suction cup.

When placing a slab of rigid material on the upper suction cup, the slab rests firstly on the top end of the piston stem which, owing to the opposing action of the opposition spring housed inside the cylindrical chamber and acting on the said piston as well as a very low value of the vacuum acting inside the cavity of the bottom suction cup, remains in the raised position, therefore preventing communication with the vacuum existing inside the cavity of the bottom suction cup.

In this way it is possible to displace the slab soon after it has been placed on the projecting ends of the pistons, causing it to slide laterally so as to position it in the desired working position on the machining table.

Increasing the vacuum level inside the suction circuit, which is firstly connected to the aforementioned cylindrical chamber upstream of the piston, this greater vacuum, together with the action of the atmospheric pressure acting on the opposite end of the piston with the weight of the slab, overcomes the opposing force of the spring, so that the piston is lowered inside the cylindrical chamber and together with it the stem and the vacuum existing in the suction circuit is connected also to the cavity of the upper suction pad which clamps the slab in the desired position.

At the end of the slab machining process it is sufficient to increase gradually the pressure inside suction circuit, while remaining below atmospheric pressure, so as to produce, as a result of expansion of the spring acting against the bottom end of the piston, the return movement of the piston stem into the raised position where the machined slab is disengaged from the upper suction pad, but the bottom suction pads still remain active so that the clamping devices remain in their predetermined positions, allowing loading of a new slab of the same type to undergo the desired machining.

When, instead, the arrangement of the clamping devices must be changed, then the atmospheric pressure is restored inside the suction ducts and therefore also inside the bottom suction pad, so that the clamping devices may be completely separated from the machining table and arranged in new positions suitable for the new types of slabs to be machined.

It should be noted that the configuration described above allows equivalent variants such as, for example, the replacement of the ducts underneath the machining table with flexible pipes connected to a single suction header: in this way, in fact, the characteristic feature of using a single vacuum or air suction circuit is maintained and in any case the flexible pipes are eliminated from the upper surface of the table.

A further embodiment of the present invention envisages that a storage crib for automatic clamping devices is associated with the table, so that it becomes possible to use the tool-holder chuck for removal of the automatic clamping devices from the storage crib and positioning thereof in the positions identified in relation to the slab to be machined.

For this purpose, the tool-holder crib of the machine may be supplemented, with the positioning inside it, of various types of handling devices able to move the automatic clamping devices and/or rigid slabs or parts thereof.

Said devices may advantageously be of two types: suction-type handling devices or magnetic devices, the former being able to move the automatic clamping devices and the slabs of rigid material or parts thereof, the latter being able to move the automatic clamping devices.

The suction-type manipulator to be used for the rigid slabs or parts thereof has the same characteristics as the manipulator of the automatic clamping devices and has dimensions and a capacity suitable for this purpose.

With this type of manipulator it is possible to achieve many objectives, first and foremost that of facilitating machining along the edges of the single parts of material resulting from cutting of the initial slab. In fact the machining of these slabs envisages initial positioning of an unprocessed slab, cutting into parts and subsequent machining of the individual parts. At present the operation of separation of the parts of the initial slab is performed by means of a manual handling operation performed by one or more operators.

Use of the suction-type pick-up device results in automation of the operation for handling the parts of the initial slab.

BRIEF DESCRIPTIONS OF DRAWINGS

These and other aspects of the present invention will become clear from the detailed description which follows of a preferred embodiment, provided with reference to the accompanying drawings in which.

DETAILED DESCRIPTION OF EMBODIMENTS OF THE INVENTION

Figure 1:
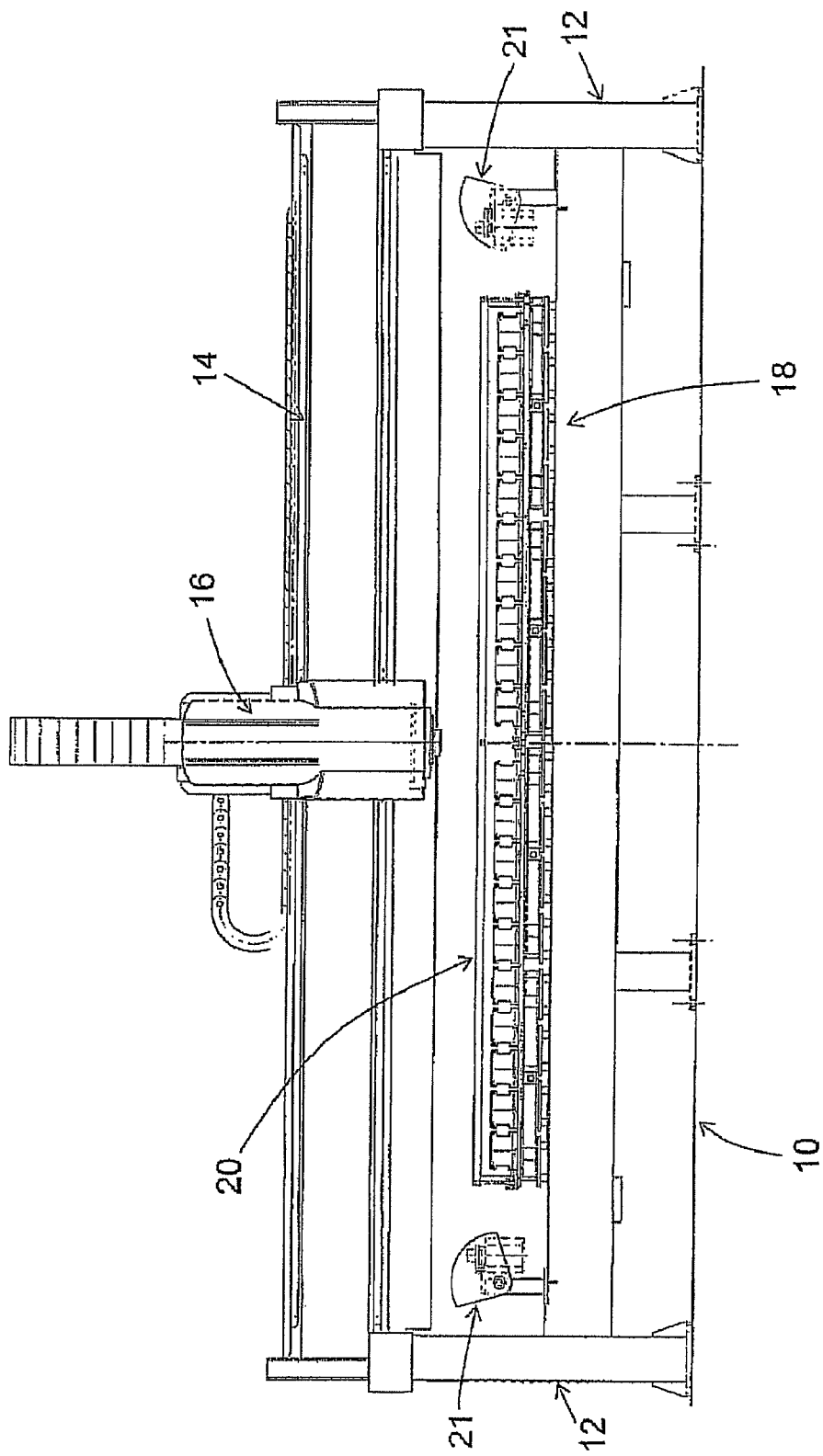
FIG. 1 is a schematic cross-sectional view of a machine of the Contourbreton type.

With reference first of all to FIG. 1, this figure shows schematically the principal components of a Contourbreton NC260 shaping machine for machining slabs or slabs of natural or conglomerate stone material, namely:

a frame 10 comprising two shoulders 12 supporting a beam 14 motor-driven so as to be displaceable along the shoulders 12;

a chuck 16 which is suitably motor-driven and movable in a controlled manner along the beam 14, said chuck carrying a tool (not shown) which may be removed from two tool cribs 21 associated with the machine, the latter being preferably equipped with a mechanism for automatically changing the tool during the slab machining cycle.

a machining surface or table denoted generically and overall by the reference number 18, the slabs to be machined being fixed on said table by means of suction-pad clamping devices, the positions of which are determined in each case depending on the length and shape of the slab using the methods already described above; and a storage crib 20 for clamping devices arranged in series.

If we now consider also FIG. 2 and FIG. 12, the table 18 consists of a continuous surface, preferably made of aluminium since rust-resistant and easily machined, intended to receive on its upper surface the slab to be machined which can be fixed in position by means of the automatic clamping devices 40 (FIG. 3) which will be described in detail below.

Figure 2:
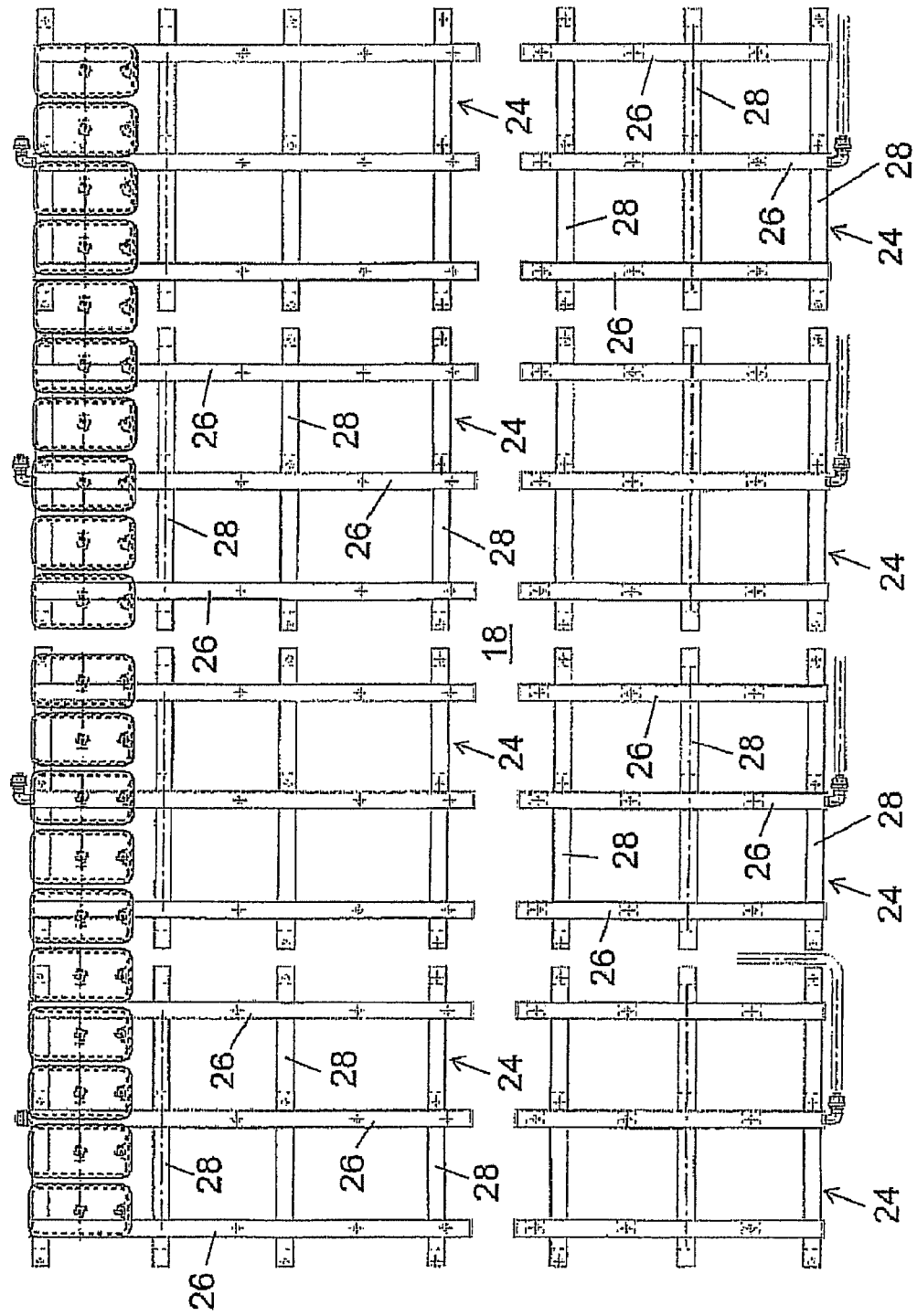
FIG. 2 is a bottom view of the machining table with the air suction circuit and the storage crib for the automatic clamping devices.

A network of channels or ducts with an arrangement such as that shown by way of example in FIG. 2 is fixed to the bottom surface of the table 18.

FIG. 2 shows, purely by way of example, eight groups 24 of ducts arranged in two rows each comprising four groups.

Each group in turn comprises three transverse ducts 26 and three longitudinal ducts 28 communicating with each other.

Each group can be connected autonomously and independently to the air suction plant (not shown) in order to obtain suction of the air and therefore generation of a vacuum by a given number of groups of ducts.

Figure 12:
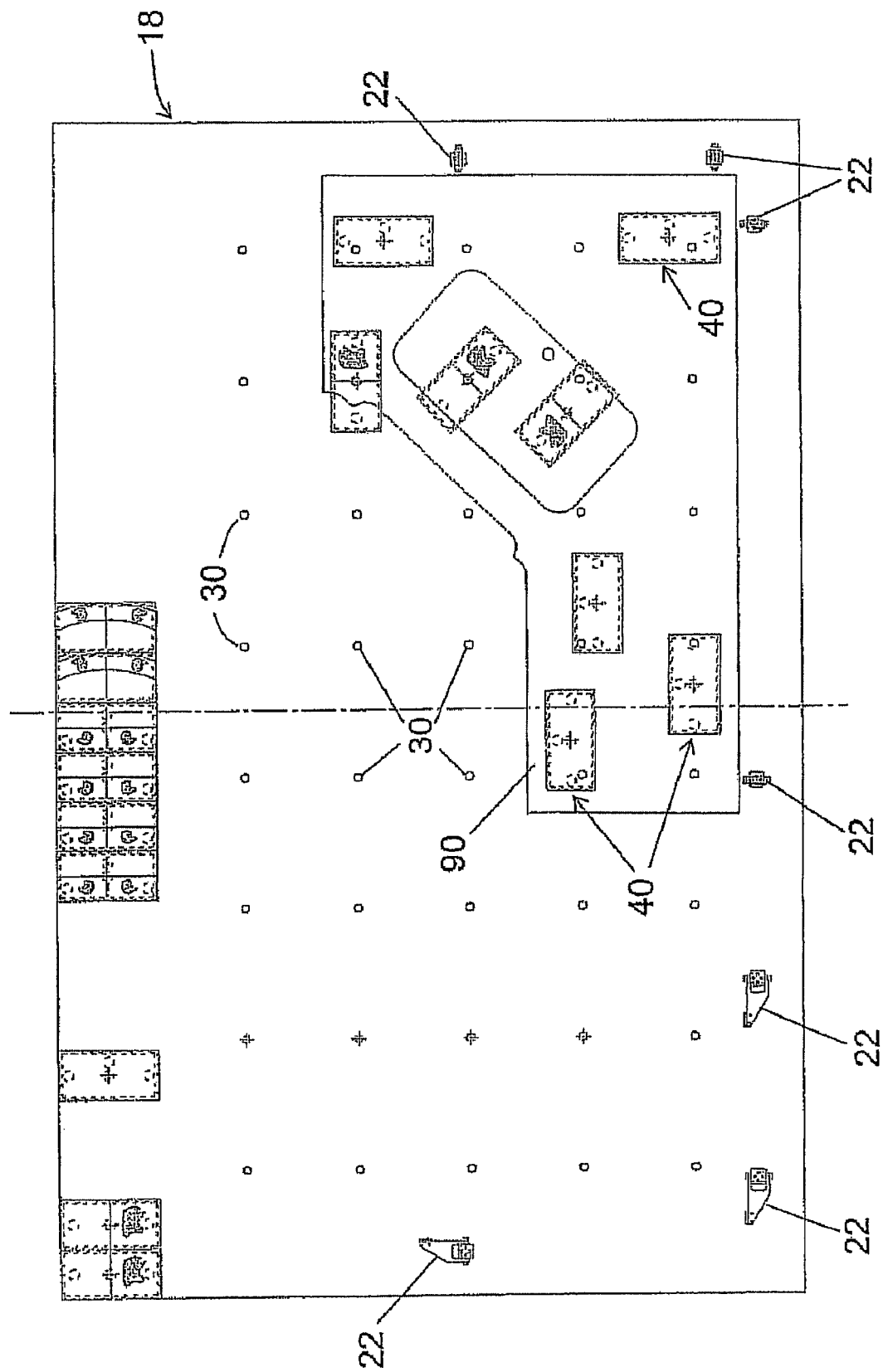
FIG. 12 is a plan view of the machining table with a slab positioned and clamped for the machining operation.

Through-holes 30 are formed in the thickness of the table 18, being arranged in a grid or checker-board pattern, for example with the arrangement shown in FIG. 12, the bottom end of said holes being in free communication with the duct 26 or 28. Each hole contains a shut-off valve 32 (described below) which controls fluid communication between the ducts (26, 28) and the automatic clamping devices 40 arranged on the upper surface of the table 18.

FIG. 12 shows the mechanical stops 22 which are arranged along the sides of the table 18 and have the function of a contact surface for the two adjacent sides or edges of a slab 90 when placed on the table 18, so as to allow precise detection of the position of the slab by the numerical control device of the machine, except where detection of the slab position is performed by means of an electronic feeler.

Figure 3:
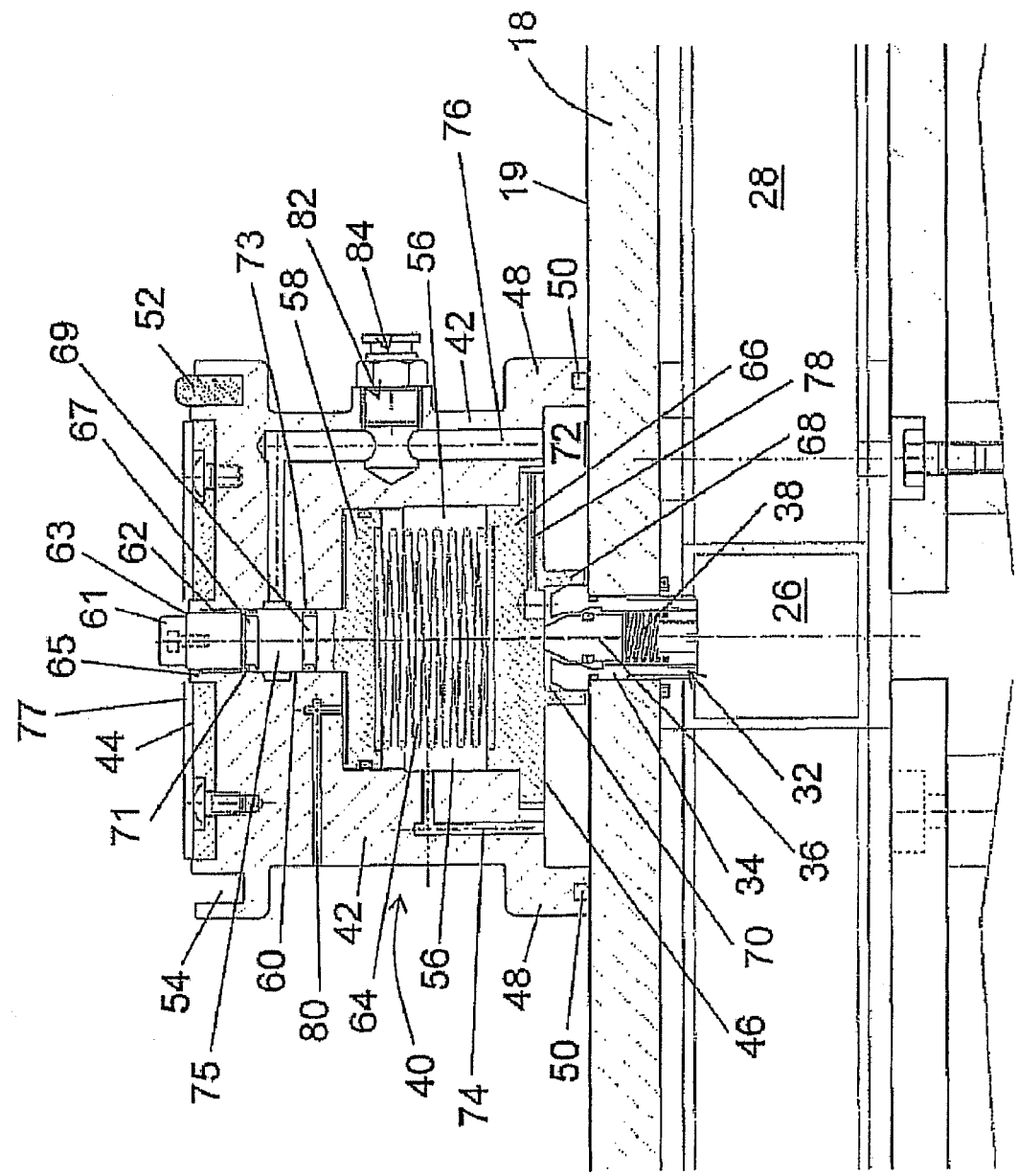
FIG. 3 is a vertically sectioned view of an automatic clamping device positioned on the machining table.
Figure 7:
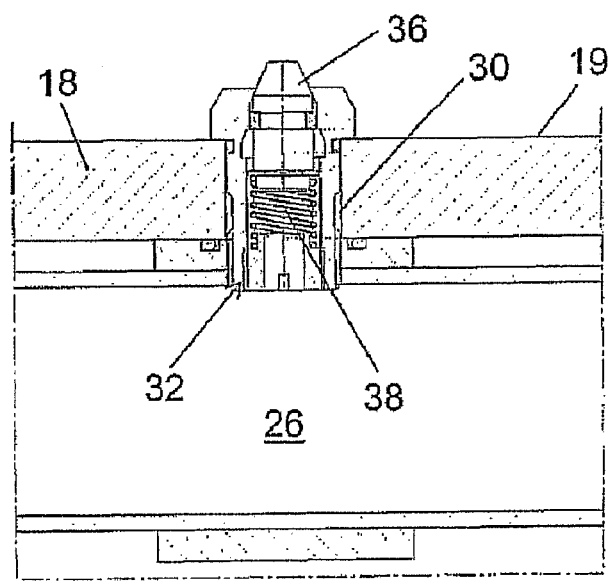
FIG. 7 is a cross-sectional view of a portion of the machining table, showing a hole with the associated shut-off valve.

Considering now FIGS. 3 and 7, these clearly shown in detail the positioning of a shut-off valve 32 comprising a cylindrical body 34 which slidably houses a closing member 36 biased towards the closing position by the opposing compression spring 38.

FIG. 7 clearly shows how the top end of the closing member 36 projects from the upper surface 19 of the table 18 so as to be engaged and actuated in the manner described below for the opening of the shut-off valve 32.

Figure 4:
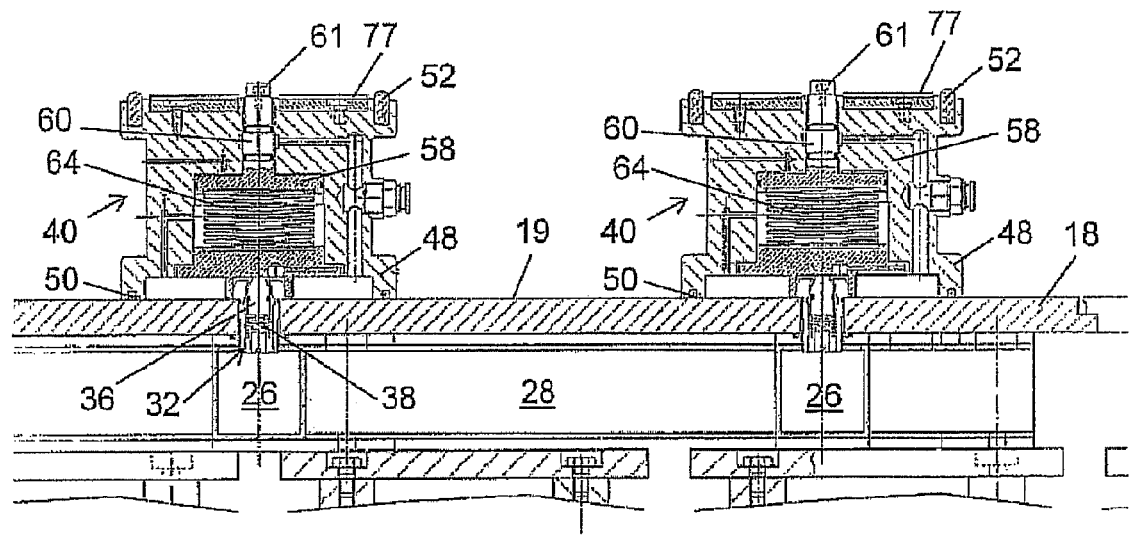
FIGS. 4, 5 and 6 are vertically sectioned views of the automatic clamping device in three operating positions.
Figure 5:
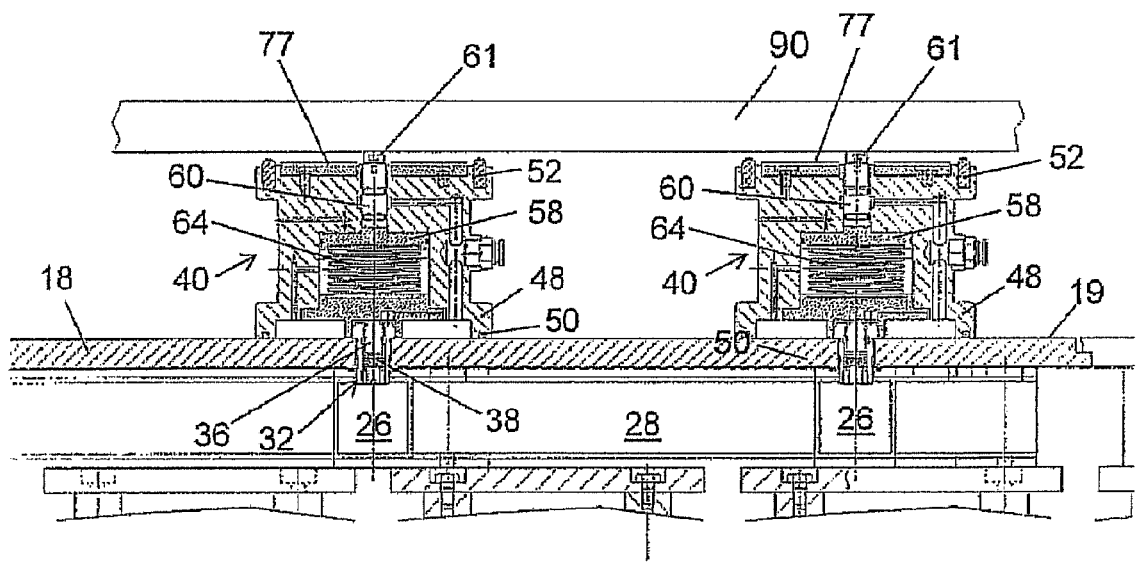
Figure 6:
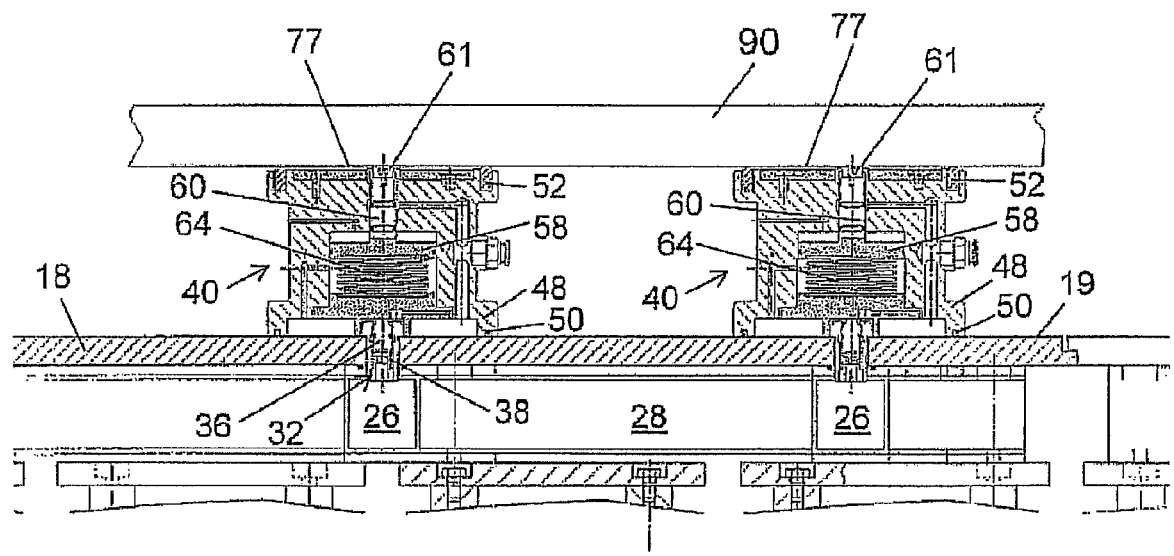

FIG. 3 as well as FIGS. 4, 5 and 6 show the automatic clamping devices 40 according to the present invention.

Each automatic clamping device 40 comprises a body 42 with a substantially parallelepiped shape, the top surface 44 and bottom surface 46 of which define a respective bottom cavity 72 and top cavity 77 which have the function of suction cups as described below.

Considering firstly the bottom surface 46, this is shaped in the manner of a bowl defined by a perimetral edge 48 designed to rest on the upper surface 19 of the table 18 hermetically by means of the seal 50 housed inside a suitable seat.

In the top surface 44 the suction cup is defined by an elastic seal 52 housed inside a perimetral groove 54 formed in the surface 44 so that the seal 52 projects from said surface, so as to provide the sealing action.

The body 42 of the automatic clamping device has, formed inside it, a cylindrical chamber 56 which slidably houses a piston 58 with a stem 60 which functions as a closing member in the manner described below, said stem shown in FIG. 3 as being integral to the piston and being housed inside a duct or passage 62 which connects the chamber 56 to the top surface 44 of the body 42.

The piston 58 is biased into the end-of-travel or completely raised position by a compression spring 64, the bottom end of which is attached to a cover 66 which closes at the bottom the cylindrical chamber 56 forming part of the bottom surface 46 of the body 42.

A circular-shaped lug 68 projects downwards from the cover 66, defining a cavity 70 and forming a seat surrounded by the bottom cavity 72 defined by the edge 48 of the bottom surface 46.

The seat defined by the lug 68, which projects from the surface 46 by an amount less than the height of the edge 48, is suitably designed to be centred and therefore coaxial with the hole 30 formed in the table 18 and with the closing member 36 of the shut-off valve 32.

The body 42 contains ducts or passages for fluid communication between the various cavities and chambers.

More specifically:

(i) the bottom cavity 72 communicates with the cylindrical chamber 56 via the duct 74 formed in the body 42;

(ii) the bottom cavity 72 communicates with the hole 62 via the duct 76 formed in the body 42;

(iii) the cavity 70 communicates with the cavity 72 via the duct 78 formed in the cover 66;

(iv) the cylindrical chamber 56 communicates, via its part situated above the piston 58, with the environment outside the device (and therefore at atmospheric pressure) via the duct 80 formed in body 42;

(v) finally, the duct 76 has a branch 82 provided with a hermetic closing valve 84, for an alternative use as described below.

From FIG. 3 it can be seen how the stem 60 has an end union 61 of smaller diameter projecting from the top surface 44 of the body 42 by amount permitted by the flared part 63 joining the end union 61 to the main body of the stem 60; the flared part is designed to engage with a narrowed shoulder 65 correspondingly shaped and radially projecting at the top end of the hole 62.

The body of the stem 60 has, formed in it, two parallel and spaced annular grooves 67 and 69 which are each situated in a plane perpendicular to the axis of the stem and which seat respective seals 71 and 73, defining the portion 75 of the stem 60 which acts as a closing member for intercepting and closing the outlet opening of the duct 76 inside the hole 62.

Considering now the operating principle of the machine according to the present invention, it envisages the following steps described with reference to FIGS. 4, 5 and 6:

(1) depending on the type of slab to be machined, the areas of the table intended to be occupied by the slab 90 and therefore the number of automatic clamping devices 40 and their positions, coinciding with the holes 30, are identified, so as to ensure optimum clamping of the slab 90 to the table 18.

In this connection it is possible to use the methods already known and used in the Contourbreton machine for positioning of the conventional clamping devices, i.e. definition of the type of slab and identification of the number and location of the clamping devices, for example with the aid of a laser ray projector which projects the shape of a slab onto the surface of the worktable.

Alternatively, by way of a further innovative feature, in the machine with the worktable configured as described above, the tool-holder chuck may also be used both for positioning the automatic clamping devices 40 on the table and for positioning the rigid slabs and their parts, as described below.

(2) An automatic clamping device 40 with its seat or cavity 70 centred relative to the projecting end of the closing member 36 is positioned opposite the previously selected holes 30 of the table 18, and therefore the corresponding shut-off valves 32, so that the closing member itself is lowered axially inside the hole 30 against the action of the opposition spring 38, establishing communication between the duct 26 or 28, depending on the situation, and the cavity 70 and therefore the cavity 72.

FIG. 4 shows the condition of the table 18 with two automatic clamping devices 40 positioned on corresponding holes 30, said positioning resulting automatically in lowering of the closing member 36 and said communication between the duct 26 or 28 and the cavities 70 and 72.

(3) The suction of air inside the ducts 26 and 28 is activated so that a sufficient degree of vacuum is established inside the cavity 72 to clamp each automatic clamping device to the upper surface of the table 18. This clamping action is achieved with a relatively small vacuum equal to about 0.8 to 0.9 bar.

(3bis) Alternatively, if a certain predetermined vacuum is already present inside the ducts 26 and 28, when the automatic clamping device is positioned with its seat engaged with the top end of the closing member the desired vacuum is immediately formed inside the cavity 72 and therefore the device is clamped to the table.

(4) In this condition the slab 90 to be machined rests on the table 18 and therefore on the ends 61 of the closing members 60 defined by the stem of the piston 58. Since the force of the compression spring 64 is relatively high and the relatively small vacuum acting inside the chamber 56 below the piston 58 (since the chamber 56 communicates freely via the duct 74 with the cavity 72 of the bottom suction cup) is unable to overcome the resilient action of the spring (even though the atmospheric pressure, via the duct 80, also acts on the top surface of the piston), the closing stems 60 are not lowered and therefore it is possible to slide the slab 90 thus supported until it comes into contact against the stops 22. This condition is clearly shown in FIG. 5.

It should be noted that the ends of the closing stems 60 are preferably made of plastic in order to facilitate sliding, by means of pushing, of the slab resting on these ends as far as the aforementioned side stops, preventing damage to the bottom surface of the slab.

(5) Once correct positioning of the slab 90 has been established, the intensity of the vacuum inside the air suction circuit is increased (if necessary by applying also a slight manual pressure downwards on the upper surface of the slab 90) in order to cause downwards displacement of the closing stems 60, until they reach the condition shown in FIG. 6, so that the vacuum existing inside the suction circuit communicates with the cavity defined above the top surface 44 of the body 42 by the seal 52, causing clamping, as a result of the suction cup effect, of the slab 90 to the body of the automatic clamping device.

It should be noted that, in order to achieve this condition, the piston 58 must be displaced downwards, overcoming the opposing force of the spring 64, but during this displacement the atmospheric pressure also acts the upper surface of the piston 58 owing to the connection formed by the connection duct 80.

High vacuum values (0.2-0.3 bar) have the dual effect of firmly clamping the automatic clamping devices to the surface of the table 18 and the slab 90 to the said devices, ensuring the necessary resistance to the significant shearing forces acting on the slab 90 during subsequent machining.

Among the noteworthy characteristic features of the present invention which must be mentioned there is the possibility of using the chuck 16 of the machine to pick up the automatic clamping devices from the storage crib and arrange them in a predetermined position depending on the shape and dimensions of the slab to be machined.

For this purpose a pick-up mechanism is provided, allowing on one hand engagement with the bottom end of the chuck 16 and, on the other side, removal of the automatic clamping devices 40 from the storage crib 20 (FIG. 1) and deposition thereof on the table 18 in the desired position or vice versa.

The pick-up mechanism may be usefully housed inside the tool crib from where it is removed by the chuck when necessary.

With reference to FIGS. 8 to 11 a handling device 100 is provided, said device comprising at the top a frustoconical shank 101, designed to be inserted and engaged in the manner known per se with the bottom end of the chuck 16 in the same way as a tool, and at the bottom two small suction cups 102 by means of which the automatic clamping device 40 can be engaged and transported. In particular, the two suction pads 102 are positioned in smooth zones of the upper surface of the automatic clamping devices 40.

Figures 10, 11:
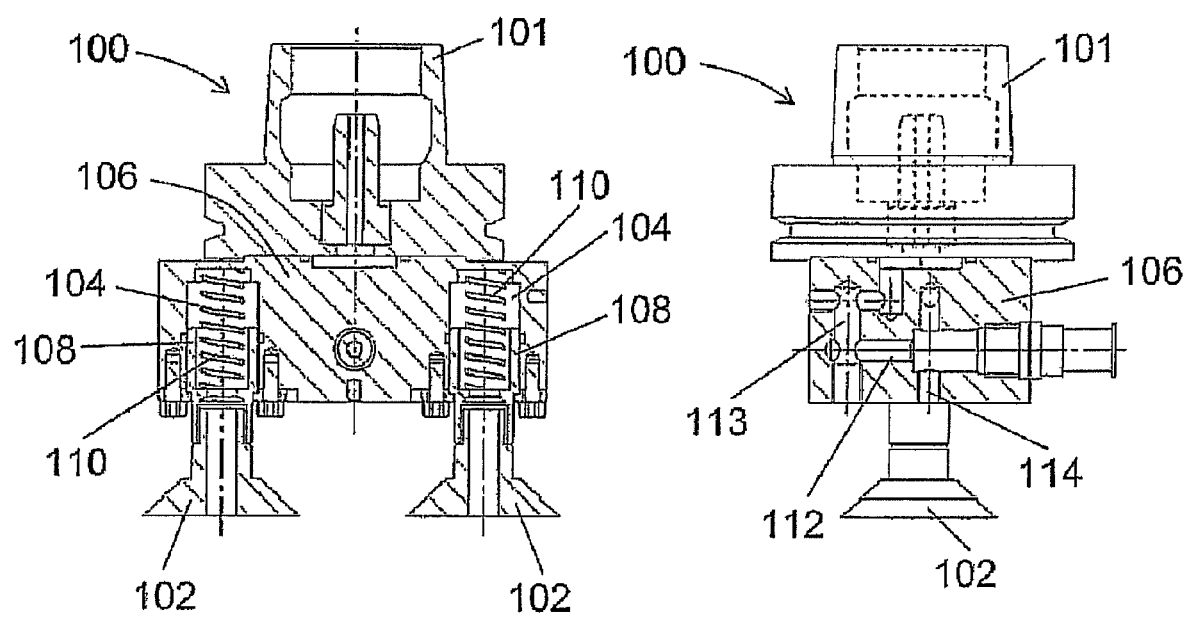

FIG. 10 shows how the two suction cups 102 are constrained inside respective cylindrical holes 104, formed in a support block 106, by means of bushes 108 which are removably secured to the said holes. The latter house compression springs 110 which allow the suction cups 102 to make cushioned contact when they engage with the top surface 44 of the automatic clamping devices 40.

In order to generate a vacuum inside the suction cups 102 advantageously use is made of the blowing circuit with which the chuck of the machine is equipped for cleaning of the chuck cone.

In particular, the handling device 100 comprises a Venturi pipe, denoted generally by the reference number 112, along the path 113 for the air which is blown for the aforementioned purpose and a connection 114 between the downstream section of the Venturi pipe 112 and the internal cavity of the small suction pads 102 so that a vacuum sufficient for satisfactory operation of the said suction cups is produced.

Alternatively, in order to create the vacuum necessary for operation of the suction pads 102, it is possible to connect temporarily the blowing circuit of the chuck to a vacuum generating pump.

Figure 8:
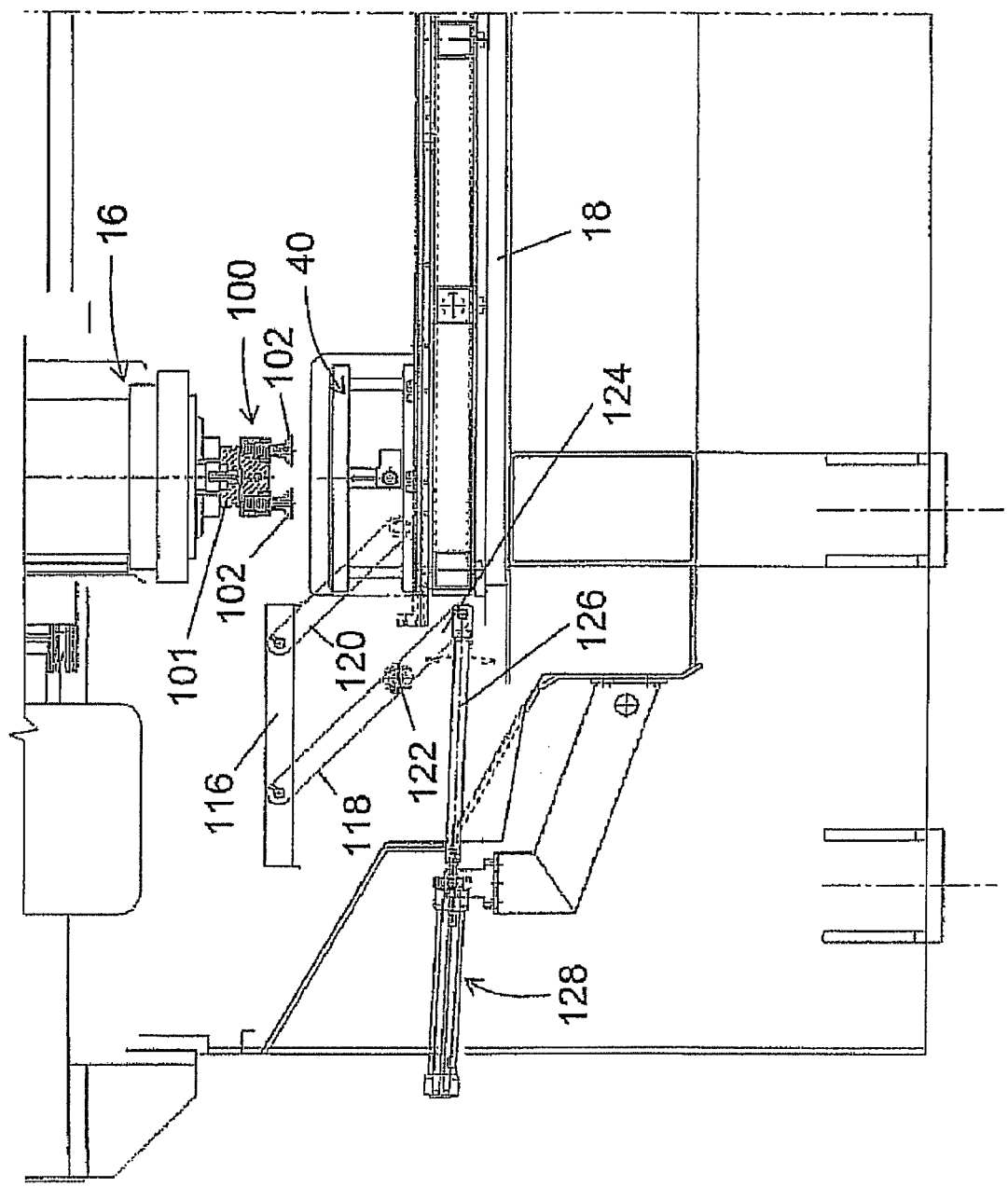
FIG. 8 shows the suction-cup mechanism for removing, moving and automatically arranging in position the automatic clamping devices.
Figure 9:
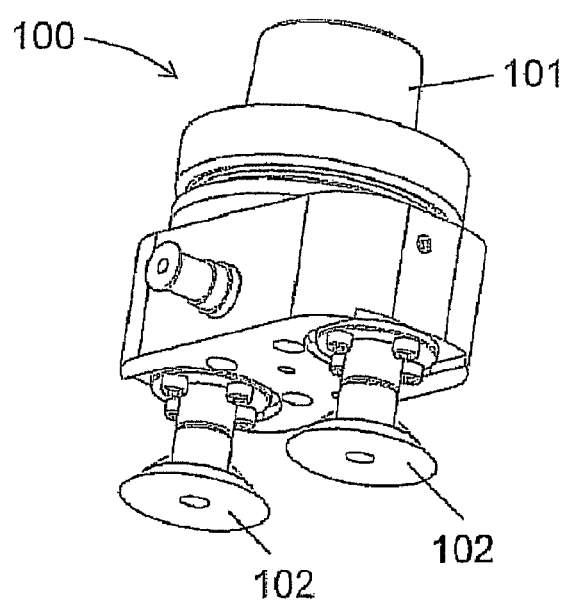
FIGS. 9, 10 and 11 are a perspective and mutually axially sectioned views, respectively, of the suction-cup device for picking up and handling the automatic clamping devices.

With reference in particular to FIG. 8, this shows how the chuck 16 for handling the automatic clamping devices 40 is used.

For this purpose, the storage crib 21 is equipped with a cover 116 which is pivotably hinged by means of two arms 118 and 220 with the frame of the machine. The arm 118 is pivotably mounted on a portion 122 and its bottom portion 124 is pivotably mounted on the stem 126 of the piston of a cylinder and piston assembly 128 in turn fixed to the machine.

When an automatic clamping device 40 must be removed from or deposited in the storage crib 21, the cylinder and piston assembly 128 is activated so as to displace the cover 116 from the position where it closes the crib 21 (not shown) into the open position, where the device 100 is able to access with the suction cups 102 an automatic clamping device 40.

Said system for handling the automatic clamping devices 40 may in the same manner be used as a device for handling rigid slabs or parts thereof, having dimensions and a capacity suitable for this purpose.

In this case it is required to provide a special loading and unloading station, each consisting for example of a rollerway or a conveyor belt, where the operations between loading of the unprocessed slabs and unloading of the finished products are automated.

Considering FIGS. 13 and 14, these show a further manipulator for the automatic clamping devices 40, referred to below as magnetic manipulator and denoted overall by the reference number 139. It comprises a support block 127 with, formed at its top end, a cone fixture 129, which is entirely similar to that of the suction-cup manipulator, which is formed so that it can be coupled with the chuck of a numerical-control machine. The bottom end of the support block 127, which is defined by an end portion 143 with a greater diameter than that of the body of the block 127, has a handling surface 132 with, formed therein, two blind holes 141 and 142 housing two pistons 130 and 131 comprising a stem (145, 146 respectively), an enlarged or mushroom-shaped head (147, 148 respectively) and a lug (156 and 157 respectively). The stem of the pistons is retained inside the respective hole by a larger-diameter collar (149, 150 respectively) which at the end of the extraction stroke of the piston engages with a contact surface formed in the end portion 143.

The heads 147 and 148 of the pistons 130 and 131 consist of permanent magnets and are biased towards the position in which they fully project from the respective holes 141 and 142 by a compression spring (153, 154 respectively).

A chamber 135 is formed in the bottom part of the block 127 and mainly inside the end portion 143, said chamber housing a mushroom-shaped piston 140, the stem 134 of which projects from the handling surface 132, through a hole coaxial (like the stem 134) with the axis of the block 127 and the cone 129. The mushroom-shaped head of the piston 140 is biased by two resilient bodies or compression springs 136 and 137 which oppose the movement of the stem 134 out from the handling surface 132. The top end of the chamber 135 communicates via the duct 138 with a pressurised fluid supply circuit, for example the blowing circuit of the machine-tool chuck.

Figure 14:
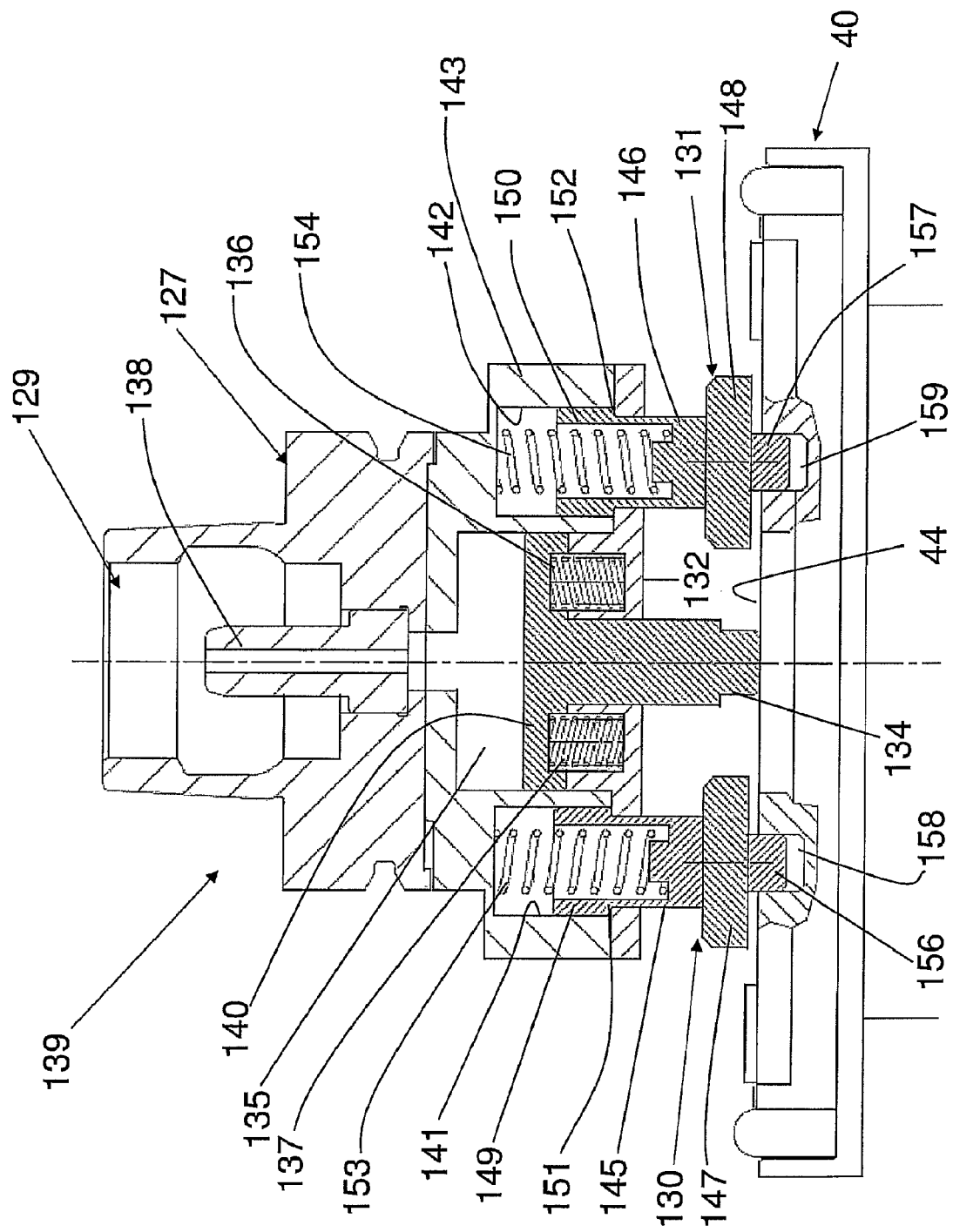

FIG. 14 shows the condition where the pressurised fluid has been supplied above the piston 140 so that the piston is lowered, compressing the springs 136 and 137 and causing the stem 134 to protrude through the aforementioned bottom hole of the said chamber.

Moreover, the surface 44 of the automatic clamping device 40 is provided with two blind holes 158 and 159 inside which the cylindrical lugs 156 and 157 of the manipulator 139 can engage.

The operating principle of the magnetic pick-up device 139 will now be briefly described.

The manipulator is firstly connected to the chuck of a numerical-control machine in the same way performed with the suction-cup manipulator described above.

During the approach towards the automatic clamping device 40, the pistons 130 and 131 are biased by the respective springs 153 and 154 into the condition where they project as fully as possible from the surface of 132 of the support block 127.

Figure 13:
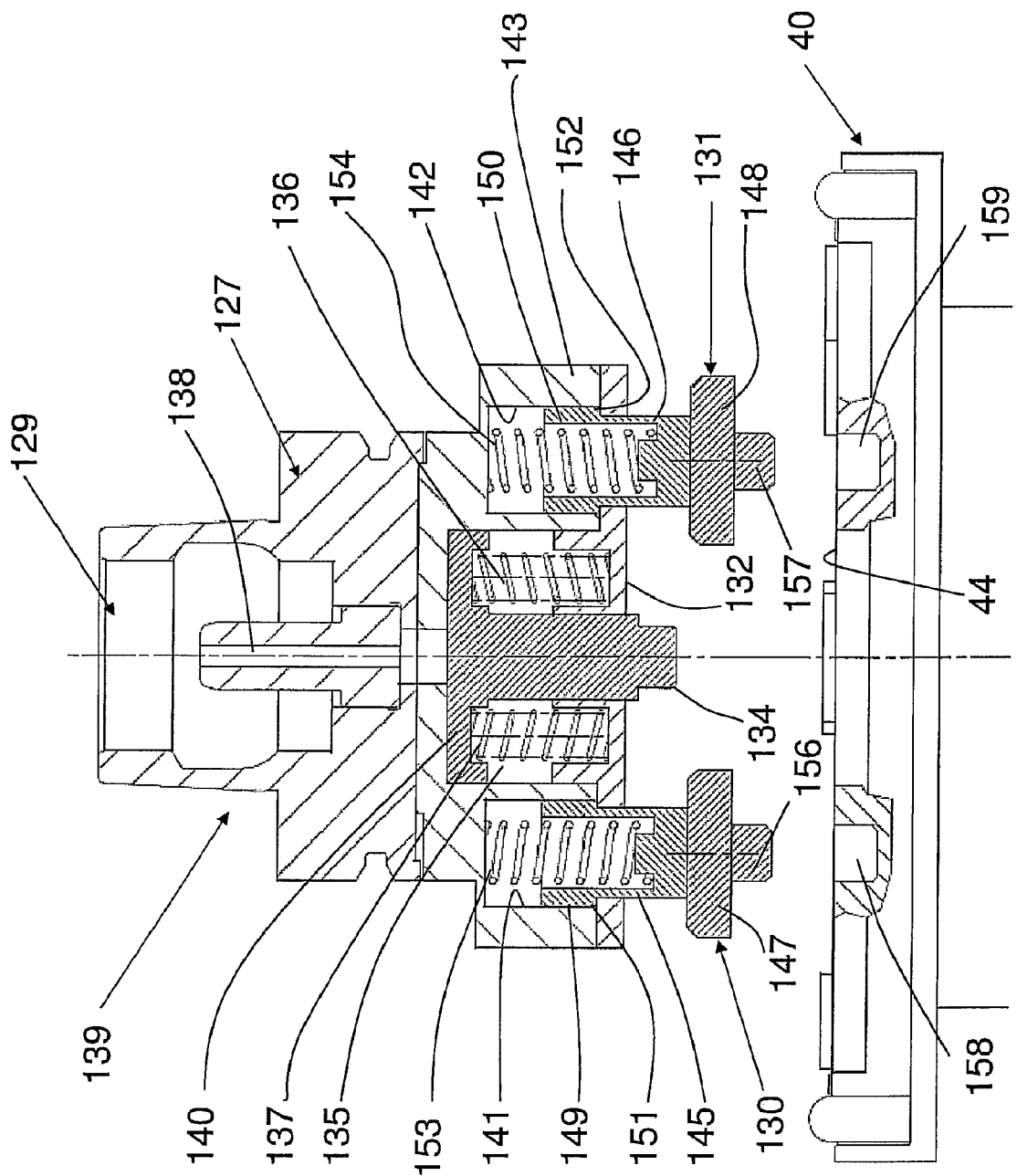
FIGS. 13 and 14 are two cross-sectional views of a magnetic device for handling the automatic clamping devices, the former during the approach movement towards an automatic clamping device and the latter during release.

The piston 140 is also kept in the rest condition shown in FIG. 13 with the stem 134 projecting slightly from the surface 132, i.e. by an amount markedly less than the distance with which the pistons 130 and 131 project from the same surface.

In this operating configuration, the automatic clamping device 40 has on its upper surface 44 zones lined with ferromagnetic material and arranged so that, when the pick-up device rests on the automatic clamping device, the aforementioned zones of ferromagnetic material are situated opposite the permanent magnet present in each of the mushroom heads 147 and 148 of the pistons 130 and 131.

Since the magnetic manipulator is lowered from above, when it comes into contact with the automatic clamping device 40 it makes use of the springs 153 and 154 in order to dampen resiliently the stroke of the pick-up device and prevent impacts which could damage both systems.

At the same time the engagement of the lugs 156 and 157 with the respective seats 158 and 159 and the engagement of the magnetic mushroom heads 147 and 148 with the zones lined with ferromagnetic material allow the pick-up device to raise the automatic clamping device and transfer it to the desired final position. Moreover, the engagement of the lugs 156 and 157 with the respective seats 158 and 159 ensures a constant orientation of the automatic clamping device with respect to the magnetic manipulator.

When the automatic clamping device 40 is in the desired position, reached in a similar way to that of the previous configuration, disengagement of said device is performed.

For this purpose supply of pressurised fluid is activated, said fluid flowing through the duct 138 and reaching the chamber 135 above the piston 140 which, as can be seen in FIG. 13, is biased downwards, overcoming the opposing force of the springs of 136 and 137 until it reaches the position shown in FIG. 14.

Displacement of the piston 140 results in corresponding projection of the stem 134 outside of the handling surface 132 until it engages with the upper surface of the automatic clamping device 40 and causes subsequent separation thereof from the magnets 147 and 148. This operation is completed by performing gradual raising of the magnetic pick-up device 139.

As before, the pick-up device may remove further automatic clamping devices from the storage crib and position them in the desired positions, or a machining tool may be mounted on it.

When removing automatic clamping devices 140 from the work surface, at the end of a machining cycle, in order to deposit them again in the storage crib, if the automatic clamping device 40 has, for any reason, moved slightly on the work surface of the machine, the lugs 156 and 157 will not manage to engage with the respective seats 158 and 159.

Figure 15:
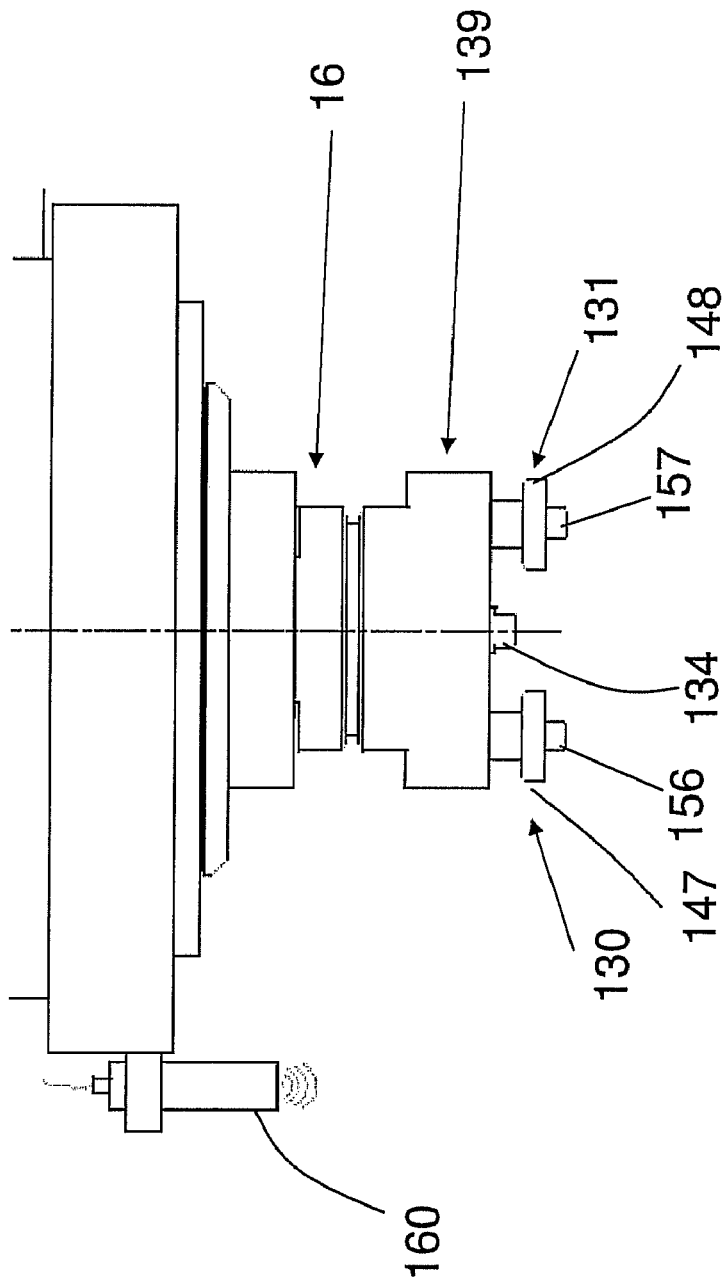
FIG. 15 shows the magnetic handling device mounted on the chuck of a shaping machine.

For this reason and with reference to FIG. 15, the toolholder chuck 16 to which the magnetic manipulator 139 is fixed has a sensor, for example an ultrasound sensor 160, able to detect the presence or absence of the automatic clamping device 40.

Should, for accidental reasons, engagement between the automatic clamping device 40 and the magnetic manipulator 139 not occur, the sensor 160 detects the absence of the automatic clamping device 40 and activates a visual and/or acoustic alarm signal which signals the error to the operator.

In this case positioning of the automatic clamping device 40 inside the storage crib is performed manually by the operator.

An alternative to the use of permanent magnets may consist in the use of an electromagnetic device (not shown). This solution envisages the use of an electromagnet (not shown), i.e. an electric conductor coil containing a core of ferromagnetic material which generates a magnetic field when an electric current is circulated in the coil.

Since electromagnets are well known in the prior art it is obvious that the person skilled in the art will be able to associate with the block 127 of the pick-up device an electromagnet able to generate a magnetic attraction force on the bottom surface, i.e. the surface 132.

When the magnetic pick-up device with the electromagnet comes into contact with the upper surface of the automatic clamping device 40 (provided obviously with a corresponding zone lined with ferromagnetic material), the electromagnet is activated and in this way pick-up is ensured.

Similarly, during release, after the automatic clamping device 40 has been brought into position, the electromagnet is deactivated.

Obviously, even though for this solution an electric power supply connection must be provided for the core of the electromagnet, which may give rise to problems since dust and machine-tool coolant is present in the working environment, a not insignificant advantage of this solution is that release of the device is immediate.

The present invention has further aspects and advantages which are particularly worth mentioning.

Firstly, the automatic clamping device 40 may have different forms and in the bottom part may have one or more seats such as that formed by the lug 68 in FIG. 3. Consequently, when the device 40 is positioned on the table 18, it is sufficient to choose which of the seats is most suitable for arrangement in a centred position with respect to one of the through-holes 30.

Secondly there are no restrictions as regards the orientation of the automatic clamping device 40, so that it may be chosen depending on the form of the slab to be clamped to the table 18 and the final shape after machining.

Moreover it is possible to envisage a plurality of automatic clamping devices with different shapes, as shown in FIG. 12, even though all provided with at least one seat defined by a lug 68 and an identical central body as well as an identical bottom part, while the top part or rather the area defined by the seal 52 may be varied depending on the clamping force to be exerted on the slab to be machined and the form of the part to be obtained by means of machining.

It is also possible to envisage that the upper seal 52 defines an area smaller than the entire extension of the upper surface 44 of the body 42.

By providing the different types of automatic clamping devices in the storage crib 20 it is possible to use in each case the devices which are most suitable depending on the form and dimensions of the slab to be clamped to the table 18 and the article obtained after machining.

It is also possible to envisage the use of the automatic clamping devices without the seat defined by the lug 68 being arranged opposite the closing member of the shut-off valve: in fact, the bottom surface 46 need only be arranged over the closing member of the shut-off valve in order for the valve to be operated and the desired vacuum to be established inside the bottom suction pad.

The use of the centring seats has the main aim of ensuring correct positioning of the automatic clamping devices on the table as well as greater resistance to the horizontal thrusts induced by the machining tool.

By way of a further alternative, to be used in the—undoubtedly exceptional—case where, owing to a particularly complex configuration of the slab or the machined article, it is not possible to define an optimum arrangement of automatic clamping devices which ensures optimum clamping of the slab, it is possible to arrange further devices in positions which are not situated over one of the shut-off valves.

In such a case the auxiliary duct 82 is used, connecting it, via a short flexible pipe to the duct 82 of a device which is positioned on a shut-off valve and is therefore connected to the air suction circuit.

In this case, by means of this arrangement, the bottom suction cup of the device 40 not positioned on a shut-off valve (which may be regarded as an auxiliary device) is connected to the bottom suction cup of the device which is instead positioned on a shut-off valve, so that the auxiliary device is in any case connected to the sole suction circuit and functions exactly in the same way as the other devices directly connected to the circuit in question.

A further measure which increases the advantageous performance features of the present invention consists in lining the upper surface 44 of the body 42 with a layer of anti-friction (usually elastomer) or rough material so that the friction during initial separation of the slab to be clamped and the automatic clamping device increases, improving the adhesion of the slab to the device and therefore to the slab.

If one wishes to use this type of automatic clamping device adopting the automatic handling procedure with chuck described above, it must be ensured that the circular zones on which the two suction pads 102 act do not have a rough lining.

Finally it must be mentioned that it is possible to exploit advantageously the fact that this type of machine is provided with a numerical control system for performing machining of the slab.

According to a further aspect of the present invention the numerical control system of the machine also controls the movement and the positioning on the worktable of the automatic clamping devices and the slabs or parts thereof.

For this purpose, the software of the machine incorporates a module which allows the operator to perform a video simulation of positioning of the automatic clamping devices on the table and the arrangement of the slab to be machined thereon, in order to define beforehand the optimum arrangement of the devices and the slab.

The information resulting from this simulation is then acquired by the numerical control system which, after the machine chuck has engaged with the device for picking up and transferring the automatic clamping devices and the slab parts, automatically performs the operations of selection, removal from the storage crib and positioning on the table.

In summary, the machine according to the present invention envisages a fully automated operating mode and an operating mode with limited automation, as follows:

(1) on the basis of the geometric data of the unprocessed slab to be machined and the finished slab, with the aid of the machine software, the number, type and position of the automatic clamping devices are defined;

(2) this information is acquired by the numerical control system of the machine;

(3) the machine chuck engages with the pick-up and transfer device situated in the storage crib and then performs removal, transfer and positioning on the table as predefined by the automatic clamping devices, one at a time;

(4) the air suction system is activated, generating a vacuum of about 0.8 to 0.9 bar inside the circuit and therefore in the bottom suction cups of the automatic clamping devices;

(5) the slab to be machined is placed on the automatic clamping devices;

(6) it is checked whether the slab is positioned with two adjacent sides making contact against the lateral mechanical stops of the table, performing any small adjustments in the position of the slab;

(7) the pressure in the suction circuit is lowered to about 0.2 to 0.3 bar, checking that the upper suction cups of the automatic clamping devices function, firmly clamping the slab to be machined;

(8) the chuck deposits the device for picking up and transferring the automatic clamping devices back in the storage crib, engages with the first tool and starts machining of the slab.

Once machining has been completed, if it is required to perform the same machining operation on another unprocessed slab, the pressure in the air suction circuit is solely set to the value 0.8 to 0.9 bar, so that the finished slab is released and may be unloaded, allowing replacement with another unprocessed slab.

If, on the other hand, it is required to perform machining of an unprocessed slab of a different type, the aforementioned operations are essentially repeated in the reverse sequence.

It is worth noting that in a simplified embodiment of the machine, for example a different operating machine without a storage crib for depositing the automatic clamping devices and without a pick-up device, the aforementioned operations where the software intervenes and the tool-holder chuck of the machine is used for picking up and positioning the automatic clamping devices are omitted, performing manual positioning of the automatic clamping devices in the predetermined positions on the table, for example using laser-ray projection of the shape of the slab to be machined, obtaining in any case the main advantages already mentioned of the present invention.

In any case, with the automated solution described above, the manual operations are limited solely to those of resting the unprocessed slab on the upper suction pads of the automatic clamping devices and removal of the finished slab at the end of machining, which manual operations could also be performed by a robotic manipulator, as described above.

As already mentioned above, the present invention is applicable to the machining of slabs made of any rigid material so that the reference to slabs or slabs of stone or conglomerate material represents a preferred but not exclusive application.

As a further alternative, it is possible to dispense with the shut-off valves housed in the holes formed in the machining table, associating instead special isolating devices with the ducts forming the air suction circuit.

In this case, after arranging the automatic clamping devices over the predetermined holes, it is sufficient to activate suction of the air using the appropriate isolating devices and with the required modulation of the vacuum in order to active firstly the bottom suction cups and then, using the procedures already described and after the slab to be machined has been placed on the upper suction cups, increase the vacuum in order to activate the latter.

The invention claimed is:

1. Automatic clamping device for clamping a slab of rigid material on a machining table of an operating machine, said automatic clamping device comprising:
   a central body terminating at respective ends thereof in a bottom cavity and a top cavity, the bottom and top cavities having a suction cup function and being intended to engage, respectively, with the table and a slab;
   wherein the bottom cavity is designed to engage with a through-hole formed in the thickness of said table and communicating with an air suction duct connected to an air suction source, so as to form a single air suction circuit, said through-hole being associated with shut-off means for interrupting communication between said bottom cavity and said air suction source; and wherein said central body has, formed therein, an inner cylindrical chamber housing a piston associated with a stem acting as a closing member, said stem being movable, together with said piston, between a first position where the stem prevents fluid communication between said bottom cavity and said top cavity and a second position where the stem allows said communication with said single air suction circuit, causing clamping, via suction cup effect, of the slab to the central body of the automatic clamping device; and wherein the central body has a first internal duct connecting the bottom cavity and the inner cylindrical chamber, and a second internal duct connecting the top cavity and the bottom cavity, and wherein the stem in the second position allows fluid communication between the top cavity and the bottom cavity via the second internal duct and apart from the inner cylindrical chamber being used as an intermediary for said communication.

2. The device according to claim 1, wherein said shut-off means comprise a valve housed inside said through-hole and having a closing member movable between a closed position and an open position against action of a first opposition spring, said bottom cavity being designed to engage with a top end of said closing member so as to displace said closing member into said open position.

3. The device according to claim 1, wherein ducts for fluid communication between said inner cylindrical chamber and said cavity are formed in said central body.

4. The device according to claim 3, wherein said inner cylindrical chamber communicates, upstream of the piston, with external environment via a further duct formed in the central body.

5. The device according to claim 1, wherein said stem has parallel and spaced annular grooves for seating seals.

6. Machine for machining slabs of rigid material, of the type comprising a table with a continuous surface, which is in communication with a series of ducts and on which a slab to be machined is placed via suction cup means for temporarily clamping the slab in a predefined position with respect to the table, said machine comprising:
   at least one tool-holder chuck mounted above the table and able to operate on a slab when in clamped condition on the table;
   a plurality of shut-off valves in a predefined arrangement, housed inside respective holes formed in thickness of said table and communicating at bottom with an air suction source, each valve having a closing member movable against opposing force of a first compression spring between a closed position of the valve, where the valve projects by a predetermined height from surface of said table, and an open position, where the valve is lowered with respect to the surface of said table, allowing free flow of air through respective said hole; and
   (b) plurality of automatic clamping devices according to claim 1, which can be associated as required with said shut-off valves.

7. The machine according to claim 6, wherein the machine also comprises a device for handling one or more of a respective automatic clamping device, rigid slabs, and parts thereof, which can be associated with the at least one tool-holder chuck by means of a frustoconical shank.

8. The machine according to claim 7, wherein said handling device comprises a support block with cylindrical holes for securing a respective suction cup for engagement with and transportation of the one or more automatic clamping device, rigid slabs, and parts thereof.

9. The machine according to claim 8, wherein said cylindrical holes house compression springs which are designed to allow the suction cups to make cushioned contact when engaging with the one or more automatic clamping device, rigid slabs, and parts thereof.

10. The machine according to claim 7, wherein said handling device comprises a support block with holes for securing a respective permanent magnet able to engage and transport the automatic clamping device, the automatic clamping device having a ferromagnetic surface.

11. The machine according to claim 10, wherein said holes are blind holes and form seats for respective pistons, the pistons each having a stem for sliding inside the holes and terminating in a mushroom head with a diameter greater than that of the holes, said mushroom head having, mounted thereon, a lug for engagement with a respective seat formed in an upper surface of the automatic clamping device and means for limiting the sliding movement of the stem so that the piston cannot project completely from the respective hole, said mushroom head being made of permanently magnetic material, said holes housing compression springs acting between a closed bottom of the hole and a rear surface of said mushroom head so as to allow magnets to make cushioned contact when engaging with the automatic clamping device.

12. The machine according to claim 11, wherein the machine comprises a device for releasing the automatic clamping system comprising in turn a piston, the movement of which out of a handling surface of the support block is controlled by springs and actuated by the pressure inside a chamber communicating with the tool-holder chuck via a further duct.

13. The machine according to claim 7, wherein the machine also comprises a device for handling a respective automatic clamping device, which can be associated with the chuck by means of a frustoconical shank (101), said handling device comprising an electromagnet, comprising an electric coil containing a core of ferromagnetic material generating a magnetic field, allowing gripping of the automatic clamping device, the automatic clamping device having a ferromagnetic surface.

14. The machine according to claim 6, wherein the machine also comprises a storage crib for positioning of the automatic clamping devices, the storage crib equipped with a cover pivotably hinged by means of arms with a frame of the machine.

15. The machine according to claim 14, wherein said cover is movable between an open and closed position of the storage crib for automatic clamping devices via cylinder/piston actuating means.

16. Method for clamping a slab of rigid material on a worktable of an operating machine, according to claim 6, characterized in that it comprises the steps of:
   (1) identifying on the table areas intended to be occupied by a slab and therefore number of engaged holes;
   (2) positioning the automatic clamping devices opposite the respective holes with the bottom cavity centered with respect to the closing member, with consequent axial lowering of the closing member inside the hole and creation of fluid communication between the ducts and the cavity;
   (3) activating suction inside the ducts with consequent clamping of the automatic clamping devices on the table;
   (4) positioning the slab to be machined on the table;
   (5) increasing the vacuum inside the air suction circuit so as to cause downward displacement of the stems of the automatic clamping devices until the inner cylindrical chamber is placed in fluid communication with the top cavity, causing clamping, by means of the suction cup effect, of the slab to the central body of each automatic clamping device.

17. The method according to claim 16, further comprising a step involving handling of each automatic clamping unit, rigid slabs and parts thereof by means of action of a handling device chosen from a storage crib hinged to the machine.

18. The device according to claim 1, wherein the stem is integral to the piston.

19. The device according to claim 1, wherein the stem is sole member for preventing fluid communication between said bottom cavity and said top cavity in said first position.

20. The device according to claim 1, wherein the stem in the second position allows fluid communication between the inner cylindrical chamber and the top cavity by way of the bottom cavity via the first and second ducts.

\* \* \* \* \*